United States Patent [19]

Sannan et al.

[11] Patent Number: 4,881,343

[45] Date of Patent: Nov. 21, 1989

[54] SEED COLORANT

[75] Inventors: Takanori Sannan, Tokyo; Mitsutaka Seki, Kawaguchi; Shinya Tsuchida, Urawa; Shojiro Horiguchi, Omiya, all of Japan

[73] Assignee: Dainichiseika Color & Chemicals Mfg. Co. Ltd., Tokyo, Japan

[21] Appl. No.: 333,003

[22] Filed: Apr. 4, 1989

Related U.S. Application Data

[62] Division of Ser. No. 152,498, Feb. 5, 1988, Pat. No. 4,853,429.

[30] Foreign Application Priority Data

Feb. 14, 1987 [JP] Japan .................. 62-30700

[51] Int. Cl.$^4$ .............................................. A01C 1/06
[52] U.S. Cl. ....................................... 47/57.6; 428/17
[58] Field of Search ........................... 47/57.6; 428/17

[56] References Cited

U.S. PATENT DOCUMENTS

| | | | |
|---|---|---|---|
| 4,272,417 | 6/1981 | Barke et al. | 47/57.6 |
| 4,368,591 | 1/1983 | Barke et al. | 47/57.6 |
| 4,448,796 | 5/1984 | Wieser et al. | 47/57.6 |
| 4,812,159 | 3/1989 | Freepons | 47/57.6 |

Primary Examiner—Lewis T. Jacobs
Attorney, Agent, or Firm—Oblon, Spivak, McClelland, Maier & Neustadt

[57] ABSTRACT

A seed colorant useful especially in coloring seeds to distinguish same from those to be used for foods is formed of an aqueous medium such as water, a dye and/or pigment of a desired hue, and a binder resin composed of the salt of chitosan and an organic acid. The seed colorant may additionally contain spherical resin particles.

10 Claims, No Drawings 4,881,343

SEED COLORANT

This is a division of application Ser. No. 152,498, filed 2/5/88, now U.S. Pat. No. 4,853,429.

BACKGROUND OF THE INVENTION (1) Field of the Invention

This invention relates to a novel agent for coloring seeds (will hereinafter be called "seed colorant"), and more specifically to a novel seed colorant having excellent adhesion to various seeds and giving good influence to the germination percentage and growth of the seeds.

(2) Description of the Prior Art

A variety of seeds such as cereals has heretofore been used in an enormous quantity for foods. Of these seeds, those to be used for seeding have been subjected to various disinfection and other chemical treatments. Their accidental use for foods is hence very dangerous. In view of this, seeds to be used for seeding are often colored in various hues so as to indicate clearly that they are for seeding.

Employed routinely as such seed colorants are those obtained by either dissolving or dispersing a dye and/or pigment in a solution of a binder resin. Regarding such a binder resin, an emulsified hydrophobic vinyl resin or a water-soluble resin is used as a synthetic binder resin by way of example. In addition, natural water-soluble resins are also used widely.

The following properties are required for such binder resins. First of all, they are not supposed to give any deleterious effects to seeds. As a second requirement, they must have sufficient adhesion to seeds.

Where an emulsion of a hydrophobic synthetic resin is used as such a binder resin for seeds, it has good adhesion to the seeds. It however involves a potential danger of giving adverse effects to the germination and growth of the seeds, because one or more monomers still remain in the emulsion and a surfactant is also used in combination in the emulsion. It is also desirable that the binder resin would be biodegraded promptly subsequent to seeding. Such a hydrophobic synthetic resin is however accompanied by a further drawback that it has poor biodegradability.

On other hand, water-soluble synthetic binder resins such as polyvinyl alcohol are free of such monomer- and surfactant-related problems. However, they are also accompanied by a drawback that their biodegradability is poor. Further, they are highly hygroscopic and are therefore inferior in adhesion. They are accompanied by a further problem that seeds are caused to get together since seed surfaces become sticky as a result of absorption of moisture.

Further, water-soluble natural binder resins such as cellulose derivatives, gelatin and casein have superb biodegradability but similar to the above-mentioned resins, they are inferior in the adhesion to seeds and other properties.

As a coloring agent, it is preferable to use a pigment having excellent fastness. This pigment is however inferior in the stability of its dispersion in a solution of such a binder resin, and therefore is not equipped sufficient stability as a coloring agent.

It has hence been desired to develop a novel seed colorant which does not have any adverse effects to seeds, can exhibit good adhesion to the seeds, has excellent biodegradability and is superb in the stability of dispersion of its pigment or pigments.

SUMMARY OF THE INVENTION

The present inventors have carried out an extensive investigation with a view toward solving problems of the prior art such as those mentioned above. As a result, the present invention has been completed.

In one aspect of this invention, there is thus provided a seed colorant comprising an aqueous medium, a dye and/or pigment, and a binder resin composed of the salt of chitosan and an organic acid. It should be borne in mind that the combined use of two or more salts of chitosan and the corresponding number of organic acids of different kinds, for example, formic acid and acetic acid, also falls within the scope of this invention. Such salts may be prepared separately or may be formed at once by reacting chitosan with two or more organic acids of different kinds.

Owing to the use of the organic acid salt of chitosan as a binder resin in the seed colorant, the present invention has brought about the following advantageous effects (1) The seed colorant does not have any adverse effects to seeds, but forms colored coating films which show germination-promoting effects on the contrary.

(2) The thus-formed colored coating films are composed mainly of chitosan which is a natural product. The coating films can therefore firmly adhere on the surfaces of seeds which have also occurred naturally, and can successfully withstand friction caused by collisions among the colored seeds in the course of their transportation or the like, so that the coating films exhibit superb adhesion.

(3) Since the principal component of the colored coating films thus formed is chitosan, the coating films show good biodegradability, and give no deleterious effects to the germination and growth of The seeds but rather promote their germination and growth.

(4) The organic acid salt of chitosan, which has already been formed into coating films, becomes moistureproof owing to partial evaporation of the organic acid so that problems attributable to the absorption of moisture do not occur any longer.

(5) The dye and/or pigment has good dispersion stability, so that no surfactant is required practically. The surfactant-related adverse effects can hence be avoided.

When an acid dye is used as a dye in particular, chitosan and the acid dye form a salt to fix the acid dye. The acid dye is hence no longer dissolved out, thereby making it possible to avoid contamination of the surrounding during storage or handling.

DETAILED DESCRIPTION OF THE INVENTION

The above and other objects, features and advantages of the present invention will become apparent from the following description of the invention and the appended claims.

The aqueous medium useful in the seed colorant of this invention is composed principally of water. It may however additionally contain a small amount of a water-soluble organic solvent, for example, an alcohol or glycol.

The dye and/or pigment useful in the practice of this invention are those known to date. Any conventional dyes and/or pigments are usable in the present invention. It is general to use such a dye and/or pigment at a total concentration of about 0.1–about 10 wt.% based on the aqueous medium.

The term "chitosan" as used herein means a substance obtained by deacetylating chitin which is contained in the integument of a crustacean such as crab, shrimp or lobster. Chitosan per se is a known material. Chitosan samples of various degrees of deacetylation and various molecular weights are readily available on the market and can also be produced with ease.

These known chitosan samples are all usable in the present invention.

Any organic acid may be used as an organic acid for the formation of a salt with chitosan as described above, so long as it has a certain degree of solubility in the aqueous medium. Illustrative examples of the organic acid may include formic acid, acetic acid, carboxylic acid, citric acid, malic acid, lactic acid, hydroxymalonic acid, malonic acid, succinic acid, adipic acid, benzoic acid, salicylic acid, aminobenzoic acid, phthalic acid and vitamin C. Among these, particularly preferred are those occurring naturally, such as lactic acid, malic acid and citric acid. As already mentioned above, two or more organic acids may also be used in combination.

The proportion of such an organic acid to be used relative to chitosan varies depending on the degree of deacetylation of chitosan (in other words, the basicity of chitosan) and the equivalent number of the acid, and cannot be specified sweepingly. As a matter of fact, it is a value which allows the resulting organic acid salt of chitosan to retain water-solubility. In general, the proportion of the organic acid may range from about 0.8 to about 2 moles per mole of amino groups in chitosan.

It is preferable to use such an organic acid salt of chitosan at a concentration of about 0.1–about 20 wt.% in the seed colorant of this invention. If it should be used too little, the strength of the resultant colored coating films will be insufficient. If it should be used too much, the viscosity of the resulting colorant will become excessively high. It is therefore not preferable to use such an organic acid salt of chitosan at any concentrations outside the above range. When such an organic acid salt is used at a higher concentration, it is preferable to use chitosan whose molecular weight is relatively low.

The seed colorant of this invention contains, as essential components, an aqueous medium, a dye and/or pigment and an organic acid salt of chitosan, such as those described above respectively. In addition, other water-soluble polymer, surfactant, disinfectant, germination promoter, growth hormone, etc. may also be incorporated so long as their addition does not impair the objects of the present invention. In particular, addition of fine resin particles conventionally called "plastic pigment" as one of such additives, for example, fine particles of an acrylic resin, polyethylene resin, polyamide resin, melamine resin, epoxy resin or the like in an amount of 10–100 parts by weight per 100 parts by weight of the organic acid salt of chitosan is preferred, since the lubricity of the resulting colored coating films is improved, the wearing resistance of the colored coating films formed on the surfaces of seeds is enhanced, and still better adhesion is obtained accordingly.

The seed colorant of this invention can be easily obtained by mixing in an arbitrary order essential and optional components such as those mentioned above and where a pigment is used as a coloring agent, by additionally processing the resultant mixture for the dispersion of the pigment.

The present invention will hereinafter be described more specifically by the following Examples, in which all designations of "part", "parts" and "%" mean part by weight, parts by weight and wt.% unless otherwise specifically indicated.

EXAMPLE 1

An aqueous solution (viscosity: 5 cps at 25° C.) of a salt of lactic acid and chitosan was prepared (concentration of chitosan 1%; concentration of lactic acid: 1%). The solution was divided into three equal portions, to which Pigment Green 7, Pigment Green 128 and Pigment Red 122 were added respectively to a concentration of 2.5%. The resultant mixtures were separately processed for the dispersion of the pigments, thereby obtaining three seed colorants of different colors according to the present invention.

Three 100-g portions of seeds for radish sprouts ("2MAMINA", trade mark) were sprayed respectively with 4 g of the three seed colorants of the different colors according to this invention. After mixing the portions of the seeds separately and thoroughly, they were dried separately.

The thus-obtained three seed samples of the different colors were separately placed in plastic bags and were strongly shaken up and down for 5 minutes. None of the seed samples developed any substantial separation of their colored coating films In addition, a germination test was conducted on each of the colored seed samples. The germination and growth were by no means inferior to those of its corresponding uncolored seeds but on the contrary, even some improvements were observed.

EXAMPLE 2

The procedure of Example 1 was repeated except for the use of citric acid as an organic acid. Good results were obtained like Example 1.

EXAMPLE 3

The procedure of Example 1 was repeated except for the use of malic acid as an organic acid. Good results were obtained like Example 1.

EXAMPLE 4

The procedure of Example 1 was repeated except for the use of a red acid dye (concentration: 0.5%) instead of the pigments. Good results were obtained like Example 1.

EXAMPLE 5

The procedure of Example 1 was repeated except for the additional use of spherical polymethacrylate resin particles ("MP-1000", trade name: product of Soken Chemical & Engineering Co., Ltd.) in an amount one half of the pigments. Good results were obtained like Example 1.

We claim:
1. Seeds colored with a colorant comprising:
an aqueous medium;
a dye and/or pigment; and
a binder resin composed of the salt of chitosan and an organic acid.
2. The seeds as claimed in claim 1, wherein the organic acid is selected from the group consisting of formic acid, acetic acid, propionic acid, butyric acid, tau- rine, pyrrolidonecarboxylic acid, citric acid, malic acid, lactic acid, hydroxymalonic acid, malonic acid, succinic acid, adipic acid, benzoic acid, salicylic acid, aminobenzoic acid, phthalic acid and vitamin C.

3. The seeds as claimed in claim 1, where the organic acid is a naturally-occurring organic acid.

4. The seeds as claimed in claim 3, wherein the naturally-occurring organic acid is lactic acid, malic acid or citric acid.

5. The seeds as claimed in claim 1, wherein the dye and/or pigment is contained at a total concentration of 0.1 - 10 wt.% of the aqueous medium.

6. The seeds as claimed in claim 1, wherein the salt has been formed by using the organic acid in an amount of 0.8 - 2 moles per mole of amino groups in the chitosan.

7. The seeds as claimed in claim 1, wherein the proportion of the salt is 0.1 - 20 wt.% based on the seed colorant.

8. The seed as claimed in claim 1, further comprising spherical resin particles.

9. The seeds as claimed in claim 8, wherein 10 - 100 parts by weight of the spherical resin particles are contained per 100 parts by weight of the salt.

10. The seeds colorant as claimed in claim 8, wherein the spherical resin particles are made of an acrylic resin, polyethylene resin, polyamide resin, melamine resin or epoxy resin.

* * * * *